US 11,359,588 B2

(12) United States Patent
Naito et al.

(10) Patent No.: US 11,359,588 B2
(45) Date of Patent: Jun. 14, 2022

(54) FUEL SUPPLY DEVICE

(71) Applicant: HITACHI ASTEMO, LTD., Hitachinaka (JP)

(72) Inventors: Toshihiko Naito, Hitachinaka (JP); Yuki Fukuda, Hitachinaka (JP)

(73) Assignee: Hitachi Astemo Ltd., Ibaraki (JP)

( * ) Notice: Subject to any disclaimer, the term of this patent is extended or adjusted under 35 U.S.C. 154(b) by 0 days.

(21) Appl. No.: 17/204,532

(22) Filed: Mar. 17, 2021

(65) Prior Publication Data

US 2021/0300175 A1 Sep. 30, 2021

(30) Foreign Application Priority Data

Mar. 25, 2020 (JP) ............................. JP2020-054830

(51) Int. Cl.
*F02M 37/00* (2006.01)
*B60K 15/03* (2006.01)
(Continued)

(52) U.S. Cl.
CPC ......... *F02M 37/0082* (2013.01); *B60K 15/03* (2013.01); *F02M 37/0023* (2013.01); *F02M 37/103* (2013.01); *F02M 37/106* (2013.01); *F02M 59/462* (2013.01); *F02M 63/005* (2013.01); *F02M 69/54* (2013.01); *G05D 9/02* (2013.01); *G05D 9/12* (2013.01);
(Continued)

(58) Field of Classification Search
CPC .......... B60K 15/03; B60K 2015/03217; B60K 2015/03243; B60K 2015/03296; B60K 2015/03276; B60K 2015/03256; B60K 2015/0777; Y10T 137/8342; Y10T 137/0396; G05D 9/12; F02M 69/54; F02M 37/0023; F02M 63/005; F02M 59/462; F02M 59/46; F02M 37/0082; F02M 37/106; F02M 37/103

See application file for complete search history.

(56) References Cited

U.S. PATENT DOCUMENTS

| | | | |
|---|---|---|---|
| 2005/0172937 A1* | 8/2005 | Torii | F02M 37/106 123/509 |
| 2010/0059025 A1* | 3/2010 | Perez | F02M 37/0023 123/510 |
| 2011/0126808 A1* | 6/2011 | Mitsudou | F02M 37/44 123/509 |

FOREIGN PATENT DOCUMENTS

| | | | | |
|---|---|---|---|---|
| JP | 2010121560 A | * | 6/2010 | |
| JP | 2015-190425 A | | 11/2015 | |
| WO | WO-2012086640 A1 | * | 6/2012 | ........... F02M 37/103 |

* cited by examiner

*Primary Examiner* — Atif H Chaudry
(74) *Attorney, Agent, or Firm* — Carrier Blackman & Associates, P.C.; Joseph P. Carrier; Anne G. Sabourin (57) ABSTRACT

In a fuel supply device including a regulator and float-type level sensor, a fitting tube is formed integrally with an upper housing, a fuel pump being retained between the upper and lower housings. An outer periphery of a base part of the regulator is fitted into the tube. A regulator retaining member is formed as a separate member from the upper housing and retains the regulator in cooperation with the tube. The tube and the retaining member are joined via a snap-fit join part provided on fitting parts therebetween. The snap-fit join part is formed by engaging a projecting portion or a recess part, formed on an elastic piece provided on one of the fitting parts between the retaining member and the tube, with the recess part or the projecting portion formed on the other fitting part. A sensor support arm is molded as a unit with the retaining member.

1 Claim, 5 Drawing Sheets

(51) Int. Cl.
*G05D 16/10* (2006.01)
*G05D 9/02* (2006.01)
*G05D 9/12* (2006.01)
*F02M 63/00* (2006.01)
*F02M 37/10* (2006.01)
*F02M 59/46* (2006.01)
*F02M 69/54* (2006.01)
*B60K 15/077* (2006.01)

(52) U.S. Cl.
CPC .. *G05D 16/103* (2013.01); *B60K 2015/03217* (2013.01); *B60K 2015/03243* (2013.01); *B60K 2015/03256* (2013.01); *B60K 2015/03276* (2013.01); *B60K 2015/03296* (2013.01); *B60K 2015/0777* (2013.01); *Y10T 137/0396* (2015.04); *Y10T 137/8342* (2015.04)

FUEL SUPPLY DEVICE

CROSS REFERENCE TO RELATED APPLICATIONS

The present application claims priority under 35 U.S.C. § 119 to Japanese Patent Application No. 2020-54830 filed Mar. 25, 2020 the entire contents of which are hereby incorporated by reference.

BACKGROUND OF THE INVENTION

Field of the Invention

The present invention relates to a fuel supply device, particularly, a fuel supply device comprising a fuel pump disposed within a fuel tank and sucking in and discharging fuel within the fuel tank, a lower housing having a fuel outlet pipe and blocking an opening in a bottom part of the fuel tank, the fuel outlet pipe being connected to fuel piping continuous to a fuel injection valve of an internal combustion engine, an upper housing linked to the lower housing, protruding into the fuel tank, and retaining the fuel pump in cooperation with the lower housing, a communication passage formed through the upper housing and the lower housing and making a fuel discharge part of the fuel pump communicate with the fuel outlet pipe, a regulator connected to the communication passage and discharging excess fuel within the communication passage into the fuel tank when the fuel pressure within the communication passage attains a predetermined value or greater, and a level sensor detecting a fuel level within the fuel tank.

Description of the Related Art

The fuel supply device is conventionally known as disclosed in, for example, Japanese Patent Application Laid-open No. 2015-190425, and in this arrangement a level sensor has an arm supporting a float by an extremity part, a rotor linked to a base part of the arm, a pivot detection part pivotably supporting the rotor and being capable of detecting a pivot angle of the rotor, and a sensor support arm supporting the pivot detection part.

In the fuel supply device of Japanese Patent Application Laid-open No. 2015-190425, the level sensor has a sensor rotor (that is, a pivot support part of the float-equipped arm) disposed in an extremity part of the sensor support arm integrally extending from an upper housing, and the rotor and the pivot detection part of the level sensor are therefore made to be as far away from the upper housing as possible. The reason therefor is that, due to the rotor and the pivot detection part of the level sensor being made to be far away from the upper housing, when assembling the fuel supply device onto a fuel tank, the rotor and the pivot detection part of the level sensor can pass through an opening of a tank bottom part on their own prior to a fuel pump passing through, thus enabling the opening area of the tank bottom part to be made as small as possible.

However, since the upper housing has provided thereon, in addition to a pump retaining part retaining the fuel pump from above, an upper half part of a communication passage and a regulator retaining part, the upper housing becomes a large component having a complicated overall structure. Because of this, if an attempt is made to further integrate the sensor support arm with such an upper housing, the structure of the upper housing becomes larger and more complicated, and if an attempt is made to mold them as a unit a molding machine that is large and has a complicated structure is required, and there is the problem that the cost becomes high, etc.

SUMMARY OF THE INVENTION

The present invention has been proposed in light of the above circumstances, and it is an object thereof to provide a fuel supply device that can solve the problems of the conventional device with a simple structure.

In order to achieve the object, according to a first aspect of the present invention, there is provided a fuel supply device comprising a fuel pump disposed within a fuel tank and sucking in and discharging fuel within the fuel tank, a lower housing having a fuel outlet pipe and blocking an opening in a bottom part of the fuel tank, an upper housing linked to the lower housing, protruding into the fuel tank, and retaining the fuel pump in cooperation with the lower housing, a communication passage formed through the upper housing and the lower housing and making a fuel discharge part of the fuel pump communicate with the fuel outlet pipe, a regulator connected to the communication passage and discharging excess fuel within the communication passage into the fuel tank when the fuel pressure within the communication passage attains a predetermined value or greater, and a level sensor detecting a fuel level within the fuel tank, the level sensor including an arm supporting a float in an extremity part thereof, a rotor linked to a base part of the arm, a pivot detection part pivotably supporting the rotor and being capable of detecting a pivot angle of the rotor, and a sensor support arm supporting the pivot detection part, a fitting tube being formed integrally with the upper housing and an outer periphery of a base part of the regulator being fitted into the fitting tube, a regulator retaining member being formed as a separate member from the upper housing and retaining the regulator in cooperation with the fitting tube, the fitting tube and the regulator retaining member being joined via a snap-fit join part provided on fitting parts therebetween, the snap-fit join part being formed by engaging a projecting portion or a recess part, formed on an elastic piece provided on either one of the fitting parts between the regulator retaining member and the fitting tube, with the recess part or the projecting portion formed on another of the fitting parts, and the sensor support arm being molded as a unit with the regulator retaining member.

In accordance with the first aspect, the fitting tube formed integrally with the upper housing and having the outer periphery of the base part of the regulator fitted thereinto is joined to the regulator retaining member, which is formed as a separate component from the upper housing and retains the regulator in cooperation with the fitting tube, via the snap-fit join part provided on the fitting parts of the two, this snap-fit join part is formed by engaging the projecting portion or the recess part, formed on the elastic piece provided on either one of the fitting parts between the regulator retaining member and the fitting tube, with the recess part or the projecting portion formed on the other of the fitting parts, and although the sensor support arm is molded integrally with the regulator retaining member, the regulator retaining member is a small component that is separate and independent from the upper housing and is for retaining the regulator, and there is no possibility that even if the sensor support arm is molded integrally with the regulator retaining member the overall structure will become complicated and large in size. Because of this, compared with a case in which as in the upper housing of the conventional device, a sensor support arm is molded integrally with a large-sized component integrally having a pump retaining part, a communication passage, and a regulator retaining part, a small molding machine with a simple structure can be employed, thus contributing to a reduction in the cost. In particular, when for example a plurality of types of fuel supply device having different lengths and angles for the sensor support arm are produced, since this can be accommodated merely by changing the regulator retaining member, which is a small component, a plurality of types of molding machines that are prepared can be small in size, and this is further advantageous in contributing to a reduction in the cost.

According to a second aspect of the present invention, in addition to the first aspect, the elastic piece is formed integrally with the regulator retaining member.

In accordance with the second aspect, since the elastic piece is formed integrally with the regulator retaining member, the regulator fitting tube of the upper housing, which is a large-sized component, may be merely provided with the projecting portion or the recess part of the snap-fit join part, and it is unnecessary to specially provide the elastic piece (and consequently the slit). That is, due to the elastic piece, which is the main cause for complicating the structure, being provided on the regulator retaining member, which is a small component, it is possible to further contribute to a reduction in the cost of molding.

According to a third aspect of the present invention, in addition to the second aspect, the regulator retaining member includes a plurality of slits arranged at intervals in a peripheral direction on a peripheral wall of an extremity part of the regulator retaining member fitted onto the outer periphery of the fitting tube, a plurality of elastic pieces, as said elastic piece, arranged in the peripheral direction are each formed from a portion, of the peripheral wall of the extremity part, sandwiched by adjacent slits in the peripheral direction, and a plurality of guide projections are formed on the outer periphery of the fitting tube, the guide projections slidably engaging with a side edge in the peripheral direction of at least some of the elastic pieces when the plurality of elastic pieces are fitted to the fitting tube so as to guide said engagement of the snap-fit join part.

In accordance with the third aspect, the regulator retaining member includes the plurality of slits arranged at intervals in the peripheral direction on the peripheral wall of the extremity part of the regulator retaining member fitted onto the outer periphery of the fitting tube, the plurality of elastic pieces arranged in the peripheral direction are each formed from a portion, of the peripheral wall of the extremity part, sandwiched by adjacent slits in the peripheral direction, and the plurality of guide projections are formed on the outer periphery of the fitting tube, the guide projections slidably engaging with a side edge in the peripheral direction of at least some of the elastic pieces when the plurality of elastic pieces are fitted to the fitting tube so as to guide said engagement of the snap-fit join part. It is therefore possible to guide sliding of the elastic pieces by means of the guide projections, thus easily and appropriately carrying out positioning (and consequently concavo-convex engagement of the snap-fit join part) of the regulator retaining member with respect to the fitting tube. Moreover, due to said engagement between the guide projection and the elastic piece, relative rotation of the regulator retaining member (and therefore the sensor support arm) with respect to the fitting tube can be reliably prevented, and it is therefore possible to suppress effectively displacement of the level sensor with respect to the upper housing even after the device assembly is complete, thereby enabling the fuel level detection precision to be maintained well over a long period of time.

The above and other objects, characteristics and advantages of the present invention will be clear from detailed descriptions of the preferred embodiment which will be provided below while referring to the attached drawings.

DESCRIPTION OF THE PREFERRED EMBODIMENT

An embodiment of the present invention is explained below by reference to the attached drawings.

Figure 1:
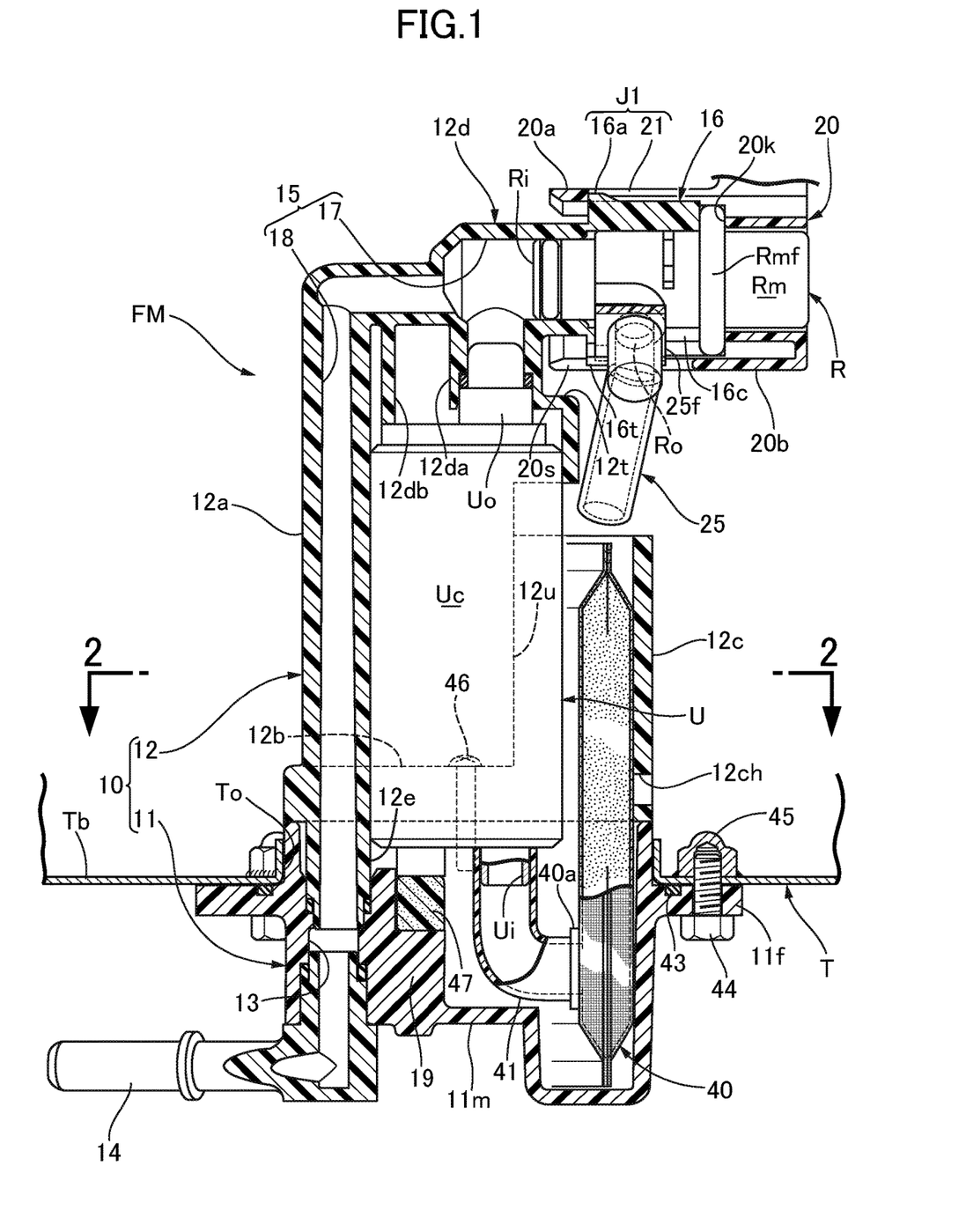
FIG. 1 is a longitudinal sectional view of an essential part of a fuel supply device related to one embodiment of the present invention (a sectional view along line 1-1 in FIG. 2).
Figure 2:
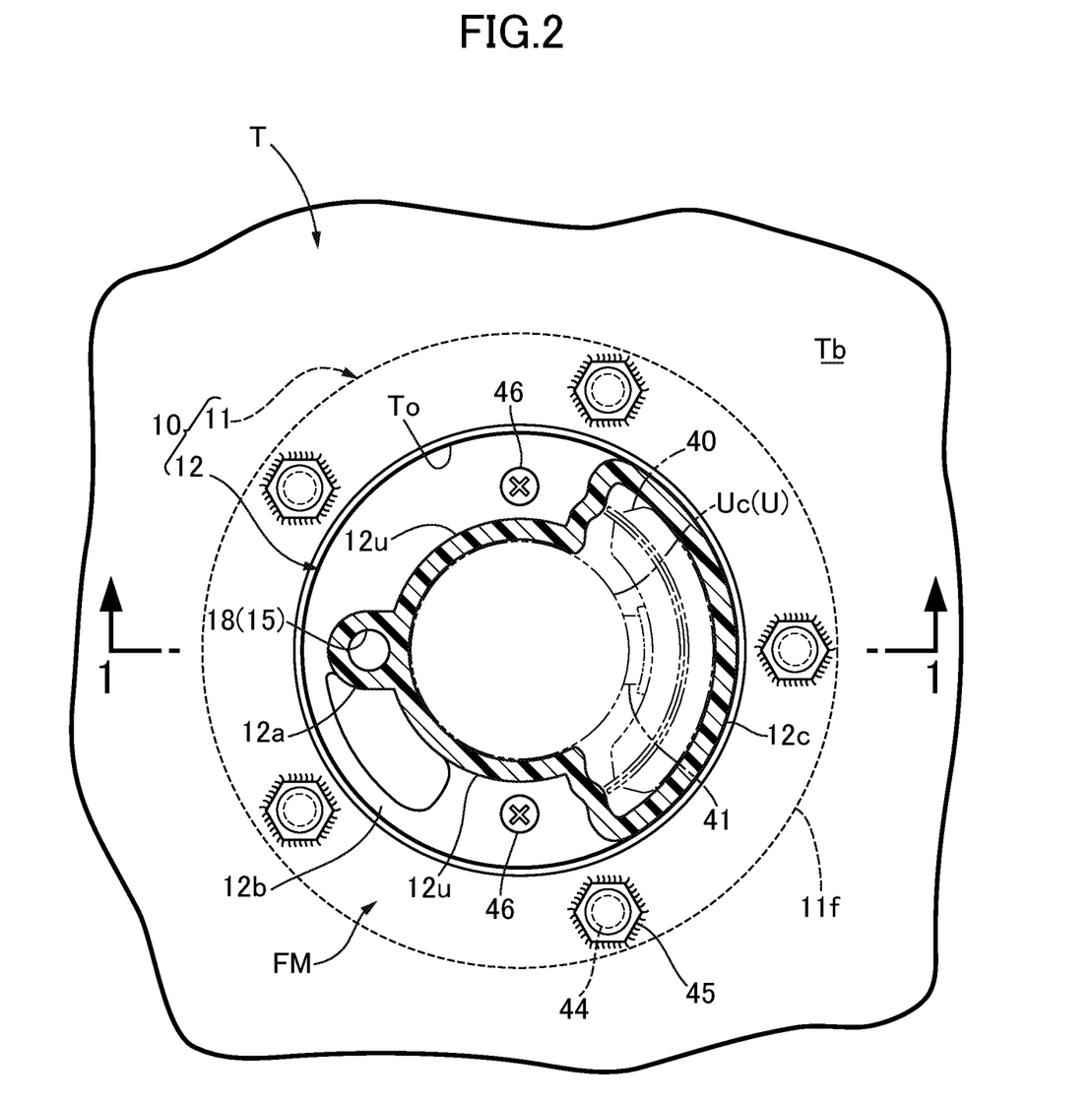
FIG. 2 is a sectional view along line 2-2 in FIG. 1.
Figure 3:
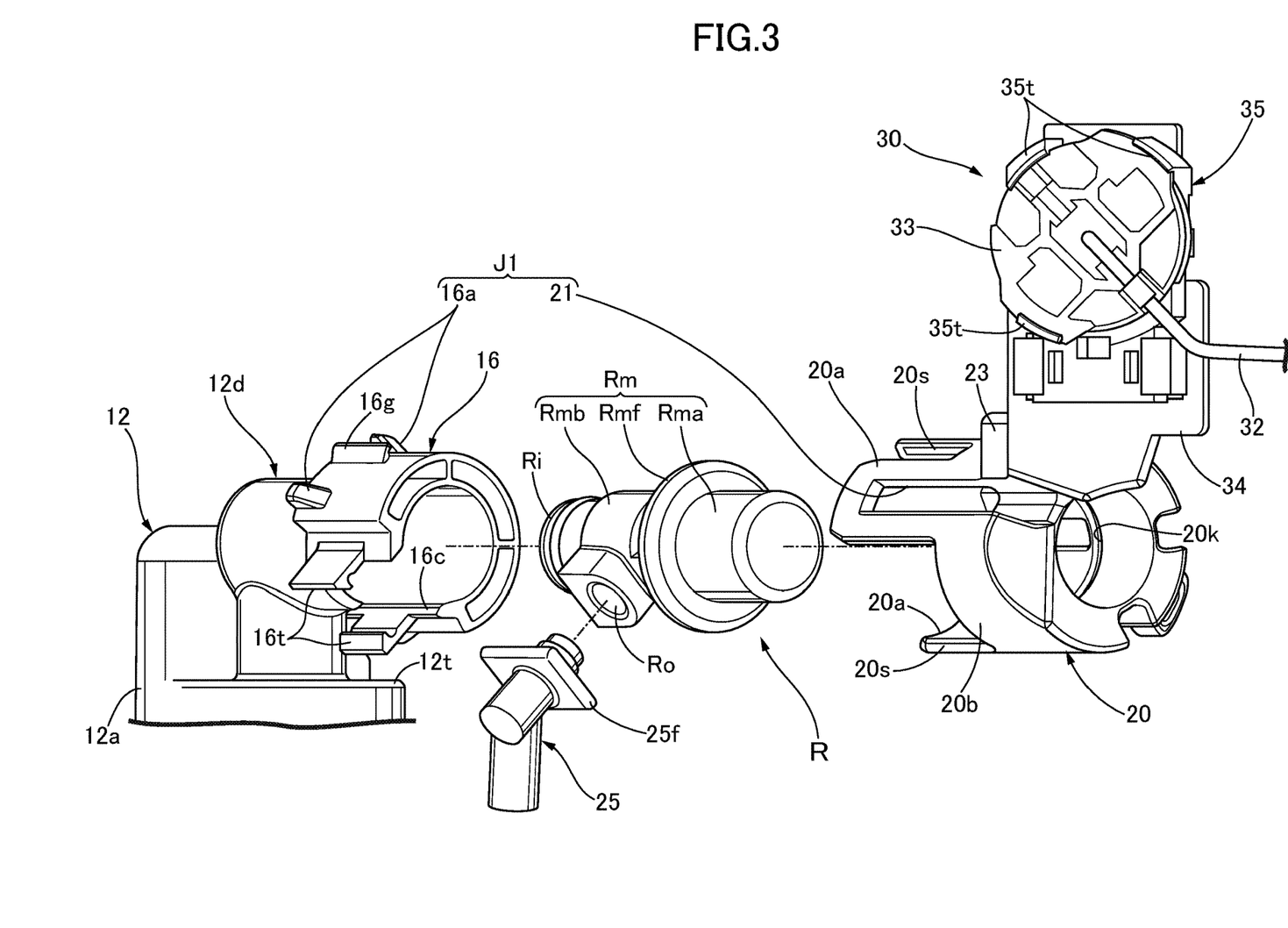
FIG. 3 is an exploded perspective view of a structure by which a regulator/level sensor is supported by an upper housing.

First, in FIG. 1, mounted on a bottom wall Tb of a fuel tank T provided on a saddle-ridden vehicle, for example, a two-wheeled motor vehicle, is a fuel pump module FM that sucks in and pressurizes fuel within the fuel tank T and supplies it to a fuel injection valve of a vehicle-mounted engine.

This fuel pump module FM includes a housing 10 fixed to the fuel tank T, an electric pump unit U housed in and retained by the housing 10, a filter 40 connected to the suction side of the pump unit U, a pressure regulator R, as a regulator, that is disposed in an upper part of the housing 10 and restricts the discharge fuel pressure of the pump unit U to no greater than a predetermined upper limit value, and a level sensor 30 that detects the fuel level within the fuel tank T. The constituent elements of the fuel pump module FM are now explained in sequence by referring in addition to FIG. 2 to FIG. 5.

The pump unit U has a cylindrical unit case Uc extending in the up-down direction within the housing 10, the unit case Uc housing a fuel pump part and an electric motor part for driving the fuel pump part so that it rotates, which are not illustrated. A suction part Ui and a discharge part Uo are projectingly provided in a lower end part and an upper end part respectively of the unit case Uc. One end part of an L-shaped connecting pipe 41 is connected to the suction part Ui, and the other end part of the connecting pipe 41 is connected to the filter 40 disposed within and retained by the housing 10.

The filter 40 is formed by housing a filter material within a flexible outer skin formed into a flattened bag shape from, for example, a net material, and a to-be-mounted portion 40a communicating with the interior of the filter material is joined to one side face of the outer skin. Said other end part of the connecting pipe 41 is connected to the to-be-mounted portion 40a. When the pump unit U is operated, fuel within the fuel tank T is therefore filtered by the filter 40, is then sucked in by the fuel pump part within the unit case Uc from the suction part Ui, via the connecting pipe 41, and is discharged toward the discharge part Uo side.

The fuel pump module FM is one example of the fuel supply device of the present invention, and the pump unit U is one example of the fuel pump of the present invention.

Formed in the bottom wall Tb of the fuel tank T is an opening To into which the fuel pump module FM is fitted, and mounted on the bottom wall Tb so as to block the opening To is the synthetic resin housing 10 of the fuel pump module FM.

The housing 10 is dividedly formed from a lower housing 11 that functions also as a cover part blocking the opening To, and an upper housing 12 that is detachably joined to the lower housing 11 and extends within the fuel tank T, the pump unit U being clamped between the lower housing 11 and the upper housing 12 in the axial direction (that is, in the up-down direction).

The lower housing 11 includes a bottomed cylindrical lower housing main body 11m that has its upper part fitted into the opening To, and an annular collar portion 11f that is projectingly provided integrally with the outer periphery of an intermediate part of the lower housing main body 11m and joined to the bottom wall Tb of the fuel tank T, in particular, a lower face of a peripheral part around the opening To. Disposed between the annular collar portion 11f and the lower face of the bottom wall Tb of the fuel tank T are an annular seal member 43 providing a liquid-tight seal therebetween and joining means providing a detachable join therebetween (for example, a bolt 44 and a weld nut 45).

The joining means is not limited to that of the embodiment, and various joining means that detachably join the annular collar portion 11f and the bottom wall Tb may be implemented. For example, the annular collar portion 11f may be fixed to the bottom wall To via a retainer that engages with the annular collar portion 11f and is joined (for example, bolted) to the bottom wall Tb.

Formed on an inner face of the lower housing main body 11m is a support projection 19 that supports the lower end of the pump unit U via a cushion 47.

Furthermore, formed in the up-down direction in the lower housing main body 11m is a through hole 13, and a base part of the fuel outlet pipe 14 is liquid-tightly fitted (for example, press fitted) into a lower part of the through hole 13. The fuel outlet pipe 14 has its base part communicating with a communication passage 15, which is described later, provided in the housing 10, and has its extremity part communicating with a fuel injection valve of an internal combustion engine, which is not illustrated, via fuel piping.

Although not illustrated, formed integrally (in this embodiment molded integrally from a synthetic resin) with an outer peripheral wall part of the lower housing main body 11m is a coupler part that can be connected to an electronically controlled device outside the fuel tank T via external wiring. A connection terminal retained by the coupler part is connected to the electric motor part of the pump unit U or a signal output part of the level sensor 30 (that is, a pivot detection part 35, which is described later).

The structure of the upper housing 12 is now explained.

The upper housing 12 includes a circular ring plate-shaped base portion 12b that is disposed and supported on the upper end of the outer periphery of the lower housing 11 and surrounds the pump unit U, a support post portion 12a that rises integrally from the base portion 12b on one side so as to sandwich the pump unit U, an arc-shaped cross section surrounding wall portion 12c that rises integrally from the base portion 12b on the other side so as to sandwich the pump unit U and covers the outer side of the filter 40, an arc-shaped cross section unit clasp wall portion 12u that rises integrally from the base portion 12b so as to provide a connection between the support post portion 12a and the surrounding wall portion 12c and concentrically surrounds the pump unit U, and a connecting tube portion 12e that integrally extends further downward than the base portion 12b immediately below the support post portion 12a.

The base portion 12b is detachably joined to the lower housing 11 by means of a plurality of bolts 46 arranged at intervals in the peripheral direction. These bolts 46 extend through the base portion 12b at a radially outer side position of the unit clasp wall portion 12u and are screwed into the lower housing 11. The surrounding wall portion 12c has a through hole 12ch or a cutout portion that provides communication between the interior and the exterior of the surrounding wall portion 12c. The filter 40, which is positioned inward of the surrounding wall portion 12c, therefore always communicates with the interior of the fuel tank T via an upper end open part of the surrounding wall portion 12c or the through hole 12ch. Moreover, opposite end parts in the peripheral direction of the surrounding wall portion 12c are bent inward in the radial direction and are joined integrally to the unit clasp wall portion 12u.

The connecting tube portion 12e is liquid-tightly fitted into an upper part of the through hole 13 of the lower housing 12, and the interior of the connecting tube portion 12e therefore communicates with the fuel outlet pipe 14 via the through hole 13.

Connectedly provided integrally with an upper part of the support post portion 12a is an extending tube portion 12d extending laterally toward a space above the surrounding wall portion 12c. An extremity part of the extending tube portion 12d is formed into a double cylindrical tubular shape, thus forming a fitting tube 16 into which the outer periphery of a base part Rmb of the pressure regulator R is fitted. Projectingly provided integrally with a peripheral wall of an intermediate part of the extending tube portion 12d are a support tube portion 12da and a support projection 12db that protrude downward and are liquid-tightly fitted onto the discharge part Uo of the pump unit U. The upper end of the unit clasp wall portion 12u and the support tube portion 12da and support projection 12db and upper part of the support post portion 12a are integrally connected via a covering wall portion 12t that covers the pump unit U from above.

A horizontal fuel passage 17 passing horizontally through the interior of the extending tube portion 12d is made to directly communicate with the upper end of a vertical fuel passage 18 extending so as to pass longitudinally through the interior of the support post portion 12a and the interior of the connecting tube portion 12e. The horizontal fuel passage 17 and the vertical fuel passage 18 form the communication passage 15 provided in the housing 10 so as to provide communication between the discharge part Uo of the pump unit U and the fuel outlet pipe 14.

The pressure regulator R is arranged so that it is usually retained in a valve-closed state and its valve is opened by the pressure generated when the discharge fuel pressure of the pump unit U exceeds a set value to thus return part of the discharged fuel to the interior of the fuel tank T, the structure and function thereof being the same as those of a conventionally known pressure regulator. With regard to the pressure regulator R of the embodiment in particular, an inlet Ri facing an upstream part of the communication passage 15 is provided at the base end of a regulator main body Rm formed in a stepped cylindrical shape, an outlet Ro is provided on the outer periphery of the base part Rmb of the regulator main body Rm, and an annular flange Rmf is projectingly provided on the outer periphery of an intermediate part of the regulator main body Rm.

When the pressure of fuel discharged from the pump unit U flowing into the regulator main body Rm via the inlet Ri exceeds a set value, the pressure regulator R operates a normally closed valve, which is not illustrated, within the regulator main body Rm so that it opens, thus discharging excess fuel toward the outlet Ro side.

A base part of a guide pipe 25 having a bent intermediate part is fixed and fitted (for example, press fitted) into the outlet Ro. An extremity part of the guide pipe 25 extends through a cutout portion 16c of the peripheral wall of the fitting tube 16 (see FIG. 3) and guides excess fuel so that it flows down to the interior of the surrounding wall portion 12c. Projectingly provided on the outer periphery of an intermediate part close to the base part of the guide pipe 25 of the present embodiment is a rectangular flange portion 25f. This flange portion 25f is latched so as to be sandwiched between a pair of latching claws 16t rising from opposite inner edges of the cutout portion 16c of the fitting tube 16.

The pressure regulator R is fixedly clamped between the fitting tube 16 formed integrally with the upper housing 12 and a regulator retaining member 20 that is a separate component from the upper housing 12 and is fitted onto the fitting tube 16. The regulator retaining member 20 is formed into a substantially cylindrical shape while enabling the outer periphery of an extremity part Rma of the pressure regulator R to be fitted thereinto.

Figure 4:
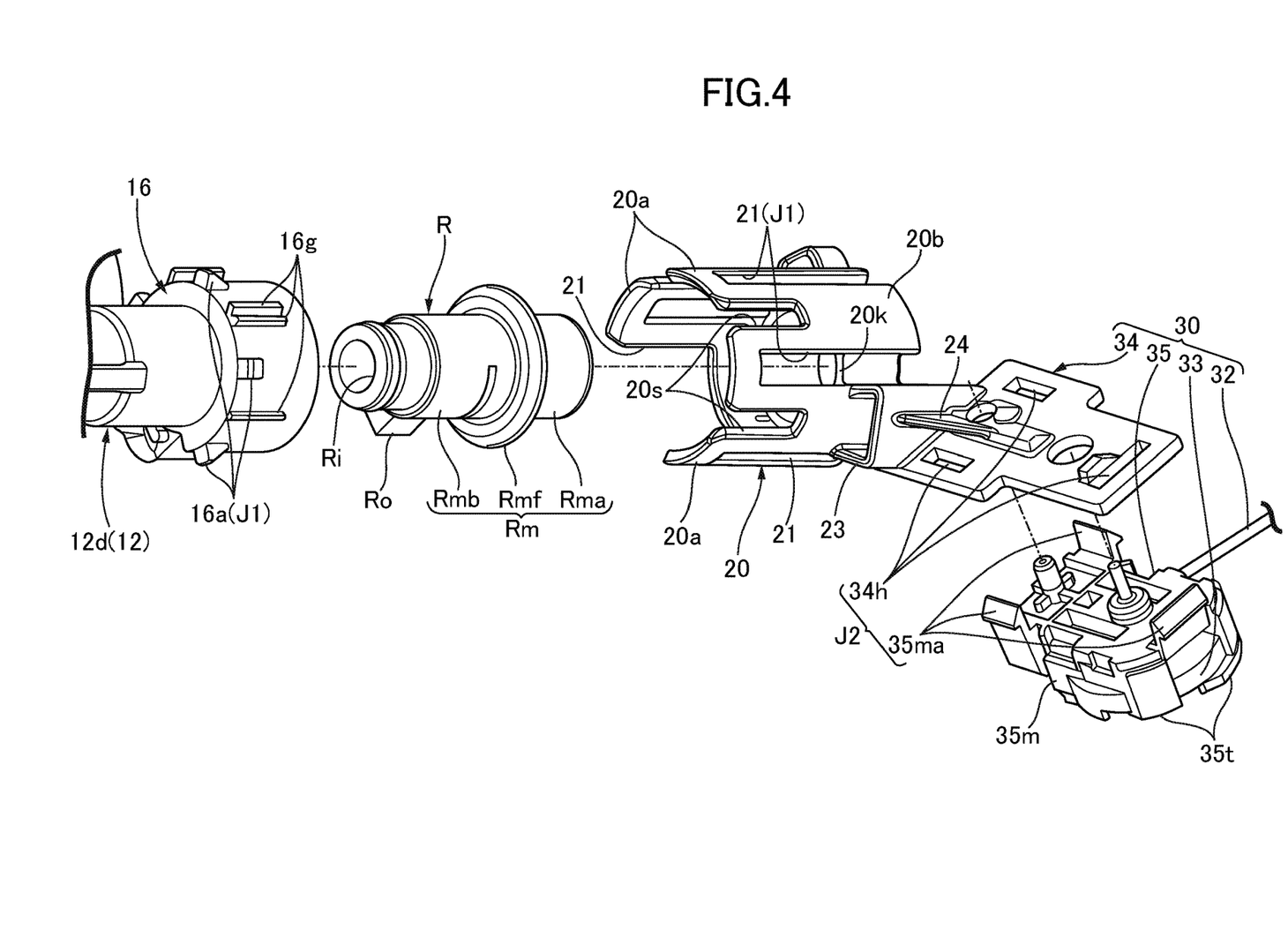
FIG. 4 is an exploded perspective view of the support structure for the regulator/level sensor when viewed from a different direction from that in FIG. 3.
Figure 5:
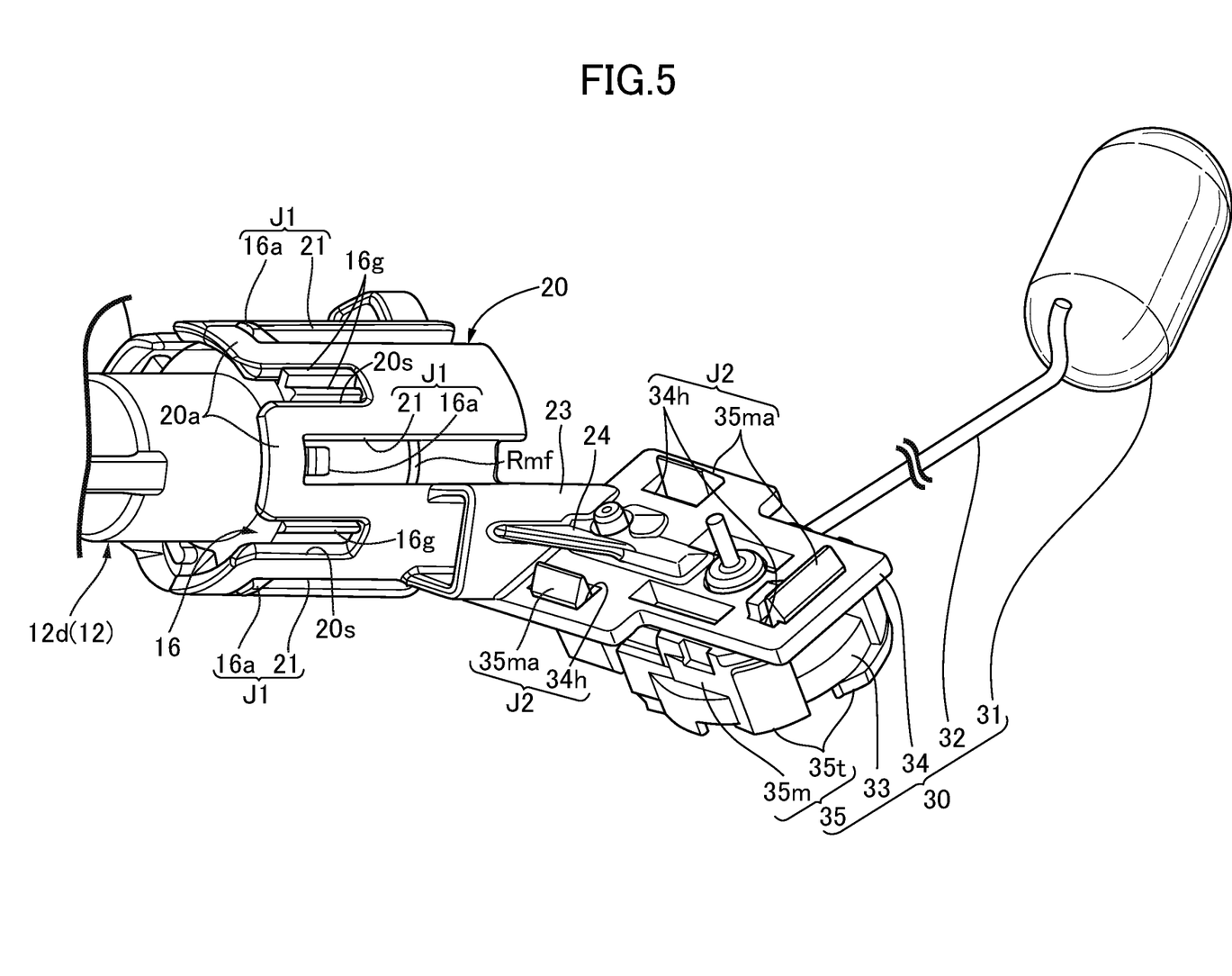
FIG. 5 is a perspective view showing an assembled state of the support structure for the regulator/level sensor when viewed from the same direction as in FIG. 4.

Formed on an inner peripheral face of an intermediate part of the regulator retaining member 20 is a step 20k extending in the peripheral direction (see FIG. 1 and FIG. 4). The annular flange Rmf on the outer periphery of the regulator main body Rm is fixedly clamped between the step 20k and the outer end of the fitting tube 16.

The fitting tube 16 and the regulator retaining member 20 are detachably joined via a snap-fit join part J1 provided on each of fitting parts thereof.

The snap-fit join part J1 is formed by engaging a projection or a recess part (a recess part 21 in the illustrated example), formed on a plurality of elastic pieces 20a provided at intervals in the peripheral direction on either one of the fitting parts between the regulator retaining member 20 and the fitting tube 16 (a base part of the regulator retaining member 20 in the illustrated example), with a recess part or a projection (a projecting portion 16a in the illustrated example) formed at intervals in the peripheral direction on the other one of the fitting parts (the fitting tube 16 in the illustrated example).

More specifically, a peripheral wall of an extremity part of the regulator retaining member 20 that is fitted onto the outer periphery of the fitting tube 16 has a plurality of slits 20s arranged at intervals in the peripheral direction, and the plurality of elastic pieces 20a arranged in the peripheral direction are formed from portions, sandwiched between slits 20s that are adjacent in the peripheral direction, of the peripheral wall of the extremity part. Formed on an outer peripheral face of the fitting tube 16 into a linear shape along the axis of the pressure regulator R are a plurality of guide projections 16g guiding engagement of the snap-fit join part J1 by slidably engaging with a side edge in the peripheral direction of at least some of the elastic pieces 20a when the plurality of elastic pieces 20a are fitted onto the fitting tube 16.

The level sensor 30 has a long narrow arm 32 supporting on its extremity part a float 31 floating on the surface within the fuel tank T, a disk-shaped rotor 33 linked to a base part of the arm 32, a pivot detection part 35 pivotably supporting the rotor 33 and being capable of detecting a pivot angle of the rotor 33, and a sensor support arm 34 supporting the pivot detection part 35.

The pivot detection part 35 has a flattened detection part main body 35m that is superimposed on a plate face of the sensor support arm 34, and a plurality of retaining claws 35t connectedly provided on the detection part main body 35m at intervals in the peripheral direction of the rotor 33. These retaining claws 35t relatively pivotably and non-separably engage with and retain the rotor 33.

Provided between opposing faces of the detection part main body 35m and the sensor support arm 34 is a snap-fit join part J2 providing a detachable join therebetween. The snap-fit join part J2 includes, for example, a latching claw 35ma provided on either one of the opposing faces of the detection part main body 35m and the sensor support arm 34 and a latching hole 34h provided in the other.

The sensor support arm 34 is integrally joined to the outer periphery of a base portion 20b of the regulator retaining member 20 (that is, an end part on the side opposite to the fitting tube 16) via a linking frame 23. The linking frame 23 is formed into a squared U-shape cross section in this embodiment and integrally rises from the outer periphery of the base portion 20b of the regulator retaining member 20; a base part of the sensor support arm 34 is integrally joined to an end part on one side of the linking frame 23, and a reinforcing rib 24 is integrally joined to and straddles the sensor support arm 34 and the linking frame 23. The regulator retaining member 20 is therefore molded from a synthetic resin material integrally with the sensor support arm 34, including the linking frame 23 and the reinforcing rib 24.

The operation of the embodiment is now explained.

In the fuel pump module FM, when the pump unit U is operated by being energized, fuel within the fuel tank T is filtered by the filter 40 and then sucked into the fuel pump part within the unit case Uc through the suction part Ui via the connecting pipe 41. Fuel that has been pressurized in the fuel pump part and discharged from the discharge part Uo reaches the fuel outlet pipe 14 via the communication passage 15 within the housing 10, and is supplied to the fuel injection valve via external piping.

During this process, the pressure regulator R is usually held in the valve-closed state, but when the discharge fuel pressure of the pump unit U exceeds a set value, the valve is opened by the pressure, and part of the discharged fuel is made to flow down and is returned to the interior of the fuel tank T (to the interior of the surrounding wall portion 12c in particular) from the guide pipe 25. This enables the discharge pressure of the pump unit U to be restricted to the set value or smaller.

As explained above, in the fuel pump module FM of the present embodiment, the fitting tube 16 formed integrally with the upper housing 12 and having the outer periphery of the base part of the regulator R fitted thereinto is joined to the regulator retaining member 20, which is formed as a separate component from the upper housing 12 and retains the regulator R in cooperation with the fitting tube 16, via the snap-fit join part J1 provided on the fitting parts of the two, and this snap-fit join part J1 is formed by engaging the projecting portion 16a or the recess part 21, formed on the elastic piece 20a provided on either one of the fitting parts between the regulator retaining member 20 and the fitting tube 16, with the recess part 21 or the projecting portion 16a formed on the other of the fitting parts.

Although the sensor support arm 34 in particular is molded integrally with the regulator retaining member 20, the regulator retaining member 20 is a small component that is separate and independent from the upper housing 12 and is for retaining the regulator R, and there is no possibility that even if the sensor support arm 34 is molded integrally with the regulator retaining member 20 the overall structure will become complicated and large in size. Because of this, compared with a case in which as in the upper housing 12 of the conventional device a sensor support arm is molded integrally with a large-sized component having a pump retaining part, a communication passage, and a regulator retaining part, a small molding machine with a simple structure can be employed, thus contributing to a reduction in the cost. In particular, when a plurality of types of fuel pump module FM having different lengths and angles for the sensor support arm 34 are produced, since this can be accommodated merely by changing the regulator retaining member 20, which is a small component, a plurality of types of molding machines that are prepared can be small in size, and this is further advantageous in contributing to a reduction in the cost.

Since the elastic piece 20a of the embodiment is formed integrally with the regulator retaining member 20 in particular, the regulator fitting tube 16 for the upper housing 12, which is a large-sized component, may be merely provided with the projecting portion 16a or a recess part of the snap-fit join part J1, and it is unnecessary to specially provide the elastic piece 20a (and consequently the slit 20s). That is, due to the elastic piece 20a, which is the main cause for complicating the structure, being provided on the regulator retaining member 20, which is a small component, it is possible to further contribute to a reduction in the cost of molding.

Furthermore, the regulator retaining member 20 has the plurality of slits 20s arranged at intervals in the peripheral direction on the peripheral wall of the extremity part thereof, into which the fitting tube 16 is fitted, the plurality of elastic pieces 20a arranged in the peripheral direction are formed from portions, sandwiched by adjacent slits 20s in the peripheral direction, of the peripheral wall of the extremity part thereof, and the plurality of guide projections 16g are formed on the outer periphery of the fitting tube 16, the guide projections 16g guiding said engagement of the snap-fit join part J1 by engaging with side edges in the peripheral direction of at least some of the elastic pieces 20a when the plurality of elastic pieces 20a are fitted to the fitting tube 16.

It is thereby possible to guide sliding of the elastic pieces 20a by means of the guide projections 16g, thus easily and appropriately carrying out positioning (and consequently concavo-convex engagement of the snap-fit join part J1) of the regulator retaining member 20 with respect to the fitting tube 16. Moreover, due to said engagement between the guide projection 16g and the elastic piece 20a relative rotation of the regulator retaining member 20 (and therefore the sensor support arm 34) with respect to the fitting tube 16 can be reliably prevented, and it is therefore possible to suppress effectively displacement of the level sensor 30 with respect to the upper housing 12 even after the device assembly is complete, thereby enabling the fuel level detection precision to be maintained well over a long period of time.

An embodiment of the present invention is explained above, but the present invention is not limited to the above-mentioned embodiment and may be modified in a variety of ways as long as the modifications do not depart from the gist of the present invention.

For example, the embodiment illustrates a case in which the bolt 46 is used as joining means for detachably joining the upper housing 12 and the lower housing 11, but another joining means (for example, press fitting means or snap-fit joining means having a similar structure to that of the snap-fit join parts J1, J2) may be used.

Furthermore, the embodiment illustrates a case in which the fuel outlet pipe 14 is formed from a separate component from the lower housing 11 and is liquid-tightly fixed afterward to the lower housing 11 (that is, press fitted into the through hole 13), but the fuel outlet pipe 14 may be formed integrally with the lower housing main body 11.

What is claimed is:

1. A fuel supply device comprising
a fuel pump disposed within a fuel tank and sucking in and discharging fuel within the fuel tank,
a lower housing having a fuel outlet pipe and blocking an opening in a bottom part of the fuel tank,
an upper housing linked to the lower housing, protruding into the fuel tank, and retaining the fuel pump in cooperation with the lower housing,
a communication passage formed through the upper housing and the lower housing and making a fuel discharge part of the fuel pump communicate with the fuel outlet pipe,
a regulator connected to the communication passage and discharging excess fuel within the communication passage into the fuel tank when the fuel pressure within the communication passage attains a predetermined value or greater, and
a level sensor detecting a fuel level within the fuel tank, the level sensor including
an arm supporting a float in an extremity part thereof,
a rotor linked to a base part of the arm,
a pivot detection part pivotably supporting the rotor and being capable of detecting a pivot angle of the rotor, and
a sensor support arm supporting the pivot detection part,
a fitting tube being formed integrally with the upper housing and an outer periphery of a base part of the regulator being fitted into the fitting tube, a regulator retaining member being formed as a separate member from the upper housing and retaining the regulator in cooperation with the fitting tube, the fitting tube and the regulator retaining member being joined via a snap-fit join part provided on fitting parts therebetween,
the snap-fit join part being formed by engaging a projecting portion or a recess part, formed on an elastic piece formed integrally with the regulator retaining member, and provided on either one of the fitting parts between the regulator retaining member and the fitting tube, with the recess part or the projecting portion formed on another of the fitting parts, and
the sensor support arm being molded as a unit with the regulator retaining member,
wherein
the regulator retaining member includes a plurality of slits arranged at intervals in a peripheral direction on a peripheral wall of an extremity part of the regulator retaining member fitted onto the outer periphery of the fitting tube,
a plurality of elastic pieces, as said elastic piece, arranged in the peripheral direction are each formed from a portion, of the peripheral wall of the extremity part, sandwiched by adjacent slits in the peripheral direction, and
a plurality of guide projections are formed on the outer periphery of the fitting tube, the guide projections slidably engaging with a side edge in the peripheral direction of at least some of the elastic pieces when the plurality of elastic pieces are fitted to the fitting tube so as to guide said engagement of the snap-fit join part.

\* \* \* \* \*